United States Patent [19]

Delorme

[11] 3,832,116
[45] Aug. 27, 1974

[54] POROUS DIE PLATE EXTRUDER
[75] Inventor: Pierre Claude Marcel Delorme, Chalon-sur-Saone, France
[73] Assignee: Pont-A-Mousson S.A., Nancy, France
[22] Filed: Nov. 24, 1972
[21] Appl. No.: 309,405

[30] Foreign Application Priority Data
Nov. 29, 1971 France .............................. 71.42633

[52] U.S. Cl.............. 425/381.2, 425/437, 425/461
[51] Int. Cl............................................ B29f 3/012
[58] Field of Search............ 425/326 R, 380, 381.2, 425/437, 461

[56] References Cited
UNITED STATES PATENTS
2,987,765   6/1961   Cichelli.......................... 425/377 X
2,987,767   6/1961   Berry et al...................... 425/377 X
3,046,603   7/1962   Maxwell........................ 425/381.2 X FOREIGN PATENTS OR APPLICATIONS
512,891   9/1939   Great Britain..................... 425/461

Primary Examiner—R. Spencer Annear
Attorney, Agent, or Firm—Sughrue, Rothwell, Mion, Zinn & Macpeak

[57] ABSTRACT

Plate extruder comprising a fixed plate and a rotatable plate mounted in a body and a die head structure associated with the body. The die head structure comprises a wall which defines the passage for the flow of the extruded material and is of a material permeable to a gaseous fluid. Passage means put the side of the wall opposed to the passage in communication with a source of fluid under pressure.

4 Claims, 4 Drawing Figures

PATENTED AUG 27 1974
3,832,116
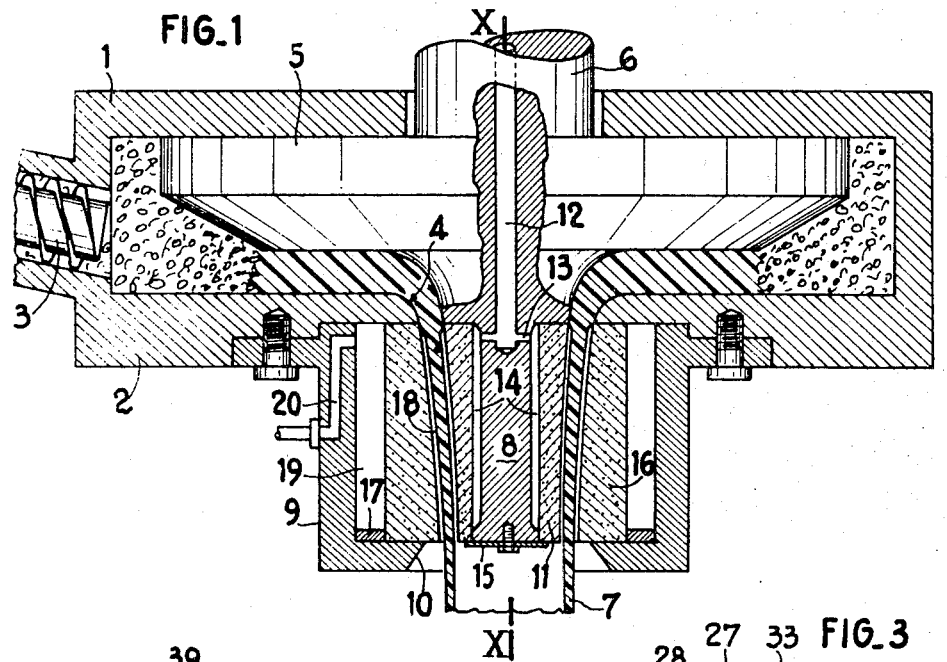
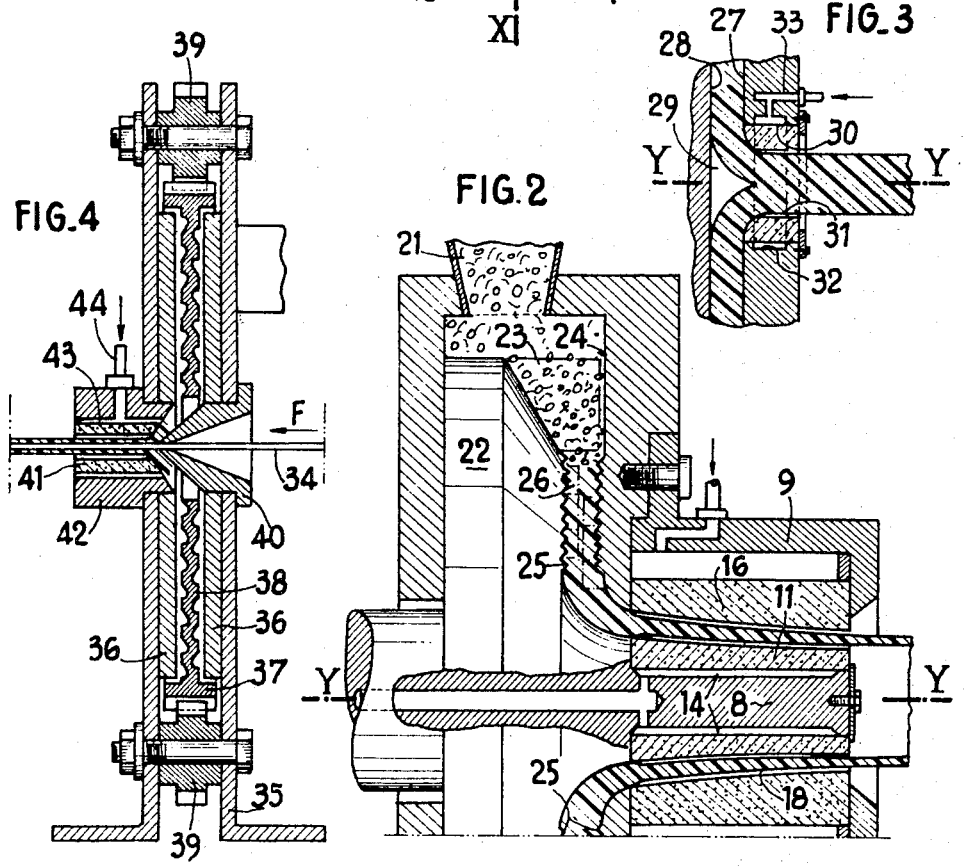

POROUS DIE PLATE EXTRUDER

The present invention relates to a plate extruder for the gelling and extrusion of plastics or elastomer materials provided with an improved die head.

Extruders are known which have coaxial and parallel plates of which one is fixed and constitutes a stator and the other is rotatable and constitutes a rotor with a radial feed orifice for the entrance of the plastics material and an axial outlet orifice of the gelled plastics material. The plastics material is sheared between the two plates and brought toward the centre, that is to say, toward the axial outlet orifice, either by the effect of at least one of the plates which has blades, fins, ribs, grooves or crests which drive the material toward the centre or by the Weissenberg effect when the plates are smooth.

The advantage of known extruders of this type over extruders having a screw is that the plastics material is gelled much quicker. The plastics material which remains in the plate extruder for a much shorter period of time than in a screw extruder is less liable to be adversely affected by the heat. The quality of the extruded product is therefore improved and the production rate is also increased — at least theoretically.

In fact, unfortunately, the adoption of such plate extruders is limited, if not retarded, in particular when the plates are smooth, owing to the excessively low extrusion pressures. This pressure is notably increased at the centre when the plates have positive mechanical means for driving the plastics material toward the centre (blades, fins, grooves, ribs).

However, there must nonetheless be added to plate extruders a short extracting or outlet screw coaxial with the plate so as to cause the plastics material to issue from the extruder under an industrially acceptable pressure and this increases the cost and overall size of the extruders.

An object of the present invention is to provide a plate extruder whose die head is such that it permits increasing the outlet pressure of the extruder without the use of an extracting or outlet screw.

The invention provides an extruder comprising a disc head which is disposed coaxial with the axis of the plates and fixed to the extruder body and has a flow passage for the extruded material, the wall defining the passage being constituted by a material permeable to a gaseous fluid and being connected, in the part of the wall opposed to the passage, to a source of fluid under pressure.

In the case where the plastics material is extruded in the form of a solid extruded product or in the form of a sheath covering an axial wire which travels through the extruder at the speed of extrusion of the extruded sheath, the wall permeable to the gaseous fluid comprises a single part which is carried by the body of the disc head and defines the flow passage.

In the case where the plastics material is extruded in the tubular form, the wall permeable to the gaseous fluid comprises an inner part which is carried by an axial core and defines the flow passage with an outer part carried by the body of the die head.

Thus it is possible to produce through the permeable wall a gaseous cushion, for example an air cushion, around the extruded product which substantially reduces the pressure drop at the outlet orifice and permits obtaining an industrially acceptable outlet pressure of the plastics material.

Further features and advantages of the invention will be apparent from the ensuing description with reference to the accompanying drawing.

In the drawing:

FIG. 1 is a diagrammatic axial sectional view of an extruder according to the invention having smooth plates and a vertical axis;

FIG. 2 is a partial view similar to FIG. 1 of a modification of a plate extruder according to the invention having a horizontal axis and mechanical means for driving the plastics material toward the centre;

FIG. 3 is a detail view similar to FIG. 2 of an extruder for forming a solid extruded product, and FIG. 4 is a diagrammatic sectional view of another plate extruder for forming the sheath of an axial wire.

The extruder shown in FIG. 1 comprises a cylindrical body 1 having an end wall which constitutes a smooth plate or fixed stator 2 having a vertical axis. A feed screw 3 for supplying the material to be extruded, for example rigid polyvinyl chloride, opens into the cavity of the body 1 substantially radially of the axis X—X. The stator 2 has an axial orifice for the outlet of the extruded plastics material. Facing the stator 2 and coaxially with the latter there is a smooth rotary circular plate or rotor 5 which is driven by a shaft 6 having an axis coinciding with the axis X—X. For the purpose of extruding a tubular product 7, the rotor 5 is extended by a nose or core 8 having an axis X—X whose diameter is less than the diameter of the outlet orifice 4 through which it extends.

An annular die head having a gaseous cushion is mounted around the outlet orifice 4. The die head comprises, disposed inside a cylindrical case 9 which is fixed to the stator 2 and has an end wall defining a large opening 10 having an axis X—X, a porous sleeve 11, for example of sintered metal having a polished surface, mounted on the core or nose 8 of the rotor. In order to adapt the die head to the extruder, the shaft 6, the rotor 5 and the core 8 have an axial passage 12 for supplying fluid under pressure, for example air, at a pressure of a few bars and the core 8 has at least one radial passage 13 which communicates with the axial passage 12 and opens into an outer peripheral annular cavity 14 formed in the surface of the core 8, the axial length of the cavity 14 being slightly less than that of the porous sleeve 11. This cavity 14 constitutes inside the sleeve 11 an annular chamber for a gaseous fluid under pressure. The porous sleeve 11 is fixed to the core 8, for example by a washer 15 which is secured to the end of the core by a screw. A porous peripheral sleeve 16 of the same material as that of the sleeve 11 is suitably centered in the case 9, for example by a washer 17. It bears against a peripheral marginal portion of the case 9 defining the opening 10 and defines with the porous sleeve 11 an annular passage 18 for the flow of the plastics material which communicates with the interior of the opening 10. The outer sleeve 16 is spaced from a cylindrical wall of the case 9 by the centering washer 17 so as to form with this case 9 a peripheral annular chamber 19 which is supplied with fluid under a pressure of a few bars, for example air, by a pipe 20 which extends through the case 9. The annular flow passage 18 is advantageously designed with a shape which is convergent toward the outlet orifice and in particular with a profile in an axial plane having an approximately hyperbolic shape.

The extruder just described operates in the following manner:

The rotor 5 and the plastics material feeding screw 3 are driven in rotation. Air under a pressure of a few bars is supplied to the passages 12 and 13 and the pipe 20. The plastics material fed by the screw 3 is extruded between the rotor 5 and the stator 2 and issues by way of the orifice 4 and the annular space 18 located between the porous sleeves 11 and 16. It is therefore not directly in contact with the walls of these sleeves. Air cushions are indeed interposed between the plastics material and the walls of the porous sleeves 11 and 16. Consequently, friction is considerably reduced and the pressure drop is very low, which permits obtaining an extruded tubular product 7 under an industrially acceptable outlet pressure.

The extruder shown in FIG. 2 has a horizontal axis Y—Y and an annular die head identical to that shown in FIG. 1. This die head is fixed to a plate extruder fed with plastics material by a hopper 21. The rotor 22 of the extruder has blades or peripheral lugs 23 which sweep through a peripheral feeding zone so as to drive the plastics material toward the gap between the plates. The rotor 22 and the stator 24 have a large number of reliefs or crests 25 disposed in the manner of a rasp or grater.

By way of a modification, the plates 22 and 24 have on the whole or a part of their facing surfaces blades, fins or ribs 26 as shown in dot-dash line in FIG. 2. These blades, fins or ribs 26 can have a curved or spiral shape or be oriented in such manner as to drive positively the plastics material toward the centre.

The extruder shown in FIG. 3 also has a horizontal axis Y—Y and is adapted to extrude a solid plastics product. FIG. 3 shows only a part of the stator 27 and rotor 28 of this extruder. The rotor 28 has a short axial nose portion 29 which is curved into a pointed shape and extends into an outlet orifice 30. In the latter there is mounted a die head constituted by a porous sleeve 31 having a suitably curved cavity, that is to say, a cavity shaped in accordance with a curve which is first convex and corresponds to the concave curve of the nose 29 of the rotor and then cylindrical. In the cylindrical wall of the orifice 30 there is machined an annular cavity 32 which forms with the porous sleeve 31 an annular chamber into which opens a pipe 33 supplying gaseous fluid. In the course of the extrusion of a solid product, an annular gaseous cushion is formed between the plastics product and the porous sleeve 31 and this reduces the friction as in the foregoing arrangements.

The plate extruder shown in FIG. 4 is adapted to cover a metal wire 34, which travels axially through the extruder in the direction of arrow F, with an extruded plastics sheath. In a housing 35, carrying two smooth plates or stators 36 in facing relation to each other, there is driven in rotation a plate or rotor 37 whose two surfaces are disposed in facing relation to the smooth plates 36 and are provided with spiral grooves 38. The rotor 37 includes a crown gearwheel which meshes with driving gears 39. One of the plates 36 has, extending therethrough, an inlet die 40 which guides the wire 34. The other plate 36 has a central opening in which is disposed a die head having means affording an air cushion. As in the embodiment shown in FIG. 3, this die head has a porous annular sleeve 41 whose centre passage defines with the wire 34 an annular extrusion passage. The porous sleeve 41 is disposed in a case 42 which is secured to the housing 35 of the extruder and has an annular chamber 43 arranged along almost the whole of the length of the porous sleeve 41. This annular chamber 43 is connected to the exterior by way of a pipe 44 supplying gaseous fluid under pressure. A plastics sheath is thus extruded onto the wire 34 which it covers without directly rubbing on the porous sleeve 41 from which it is separated by a cushion of gaseous fluid under pressure.

It will be understood that it is possible to equip any type of plate extruder other than those described hereinbefore with an outlet die head of this type having means producing a gaseous cushion.

I claim:

1. A plate extruder comprising a body, a fixed plate and a rotatable plate mounted in the body in facing relation to each other on an axis, a die head structure which is disposed coaxial with the axis of the plates and is fixed to the extruder body and comprises wall means having a surface defining a passage for the flow of extruded material under pressure, the wall means being composed of a material permeable to a gaseous fluid, and passage means for putting a surface of the wall means opposed to said surface defining the passage in communication with a source of gaseous fluid under pressure.

2. A plate extruder comprising a body, a fixed plate having an outlet orifice and a rotatable plate which are mounted in the body in facing relation to each other on an axis, a die head structure which is disposed coaxial with the axis of the plates and is associated with the extruder body and comprises a case fixed to the body, a core which is integral with the rotary plate and extends through the outlet orifice, an inner annular porous sleeve permeable to a gaseous fluid mounted on the core, an outer annular porous sleeve permeable to a gaseous fluid disposed in the case, the two sleeves having first surfaces defining between the surfaces an annular passage for the flow of extruded material under pressure in a tubular form, and second surfaces opposed to the first surfaces, a first annular chamber for gaseous fluid formed in the core and communicating with the second surface of the inner porous sleeve, a second annular chamber for gaseous fluid formed in the case and communicating with the second surface of the outer porous sleeve and passage means connected to the two chambers for supplying gaseous fluid under pressure to the two chambers, the passage means extending through the rotary plate and core and through the case.

3. A plate extruder comprising a body, a fixed plate having an outlet orifice and a rotatable plate which are mounted in the body in facing relation to each other on an axis, a die head structure which is disposed coaxial with the axis of the plates, the die head structure comprising a single annular porous sleeve permeable to a gaseous fluid disposed in the outlet orifice and having an inner surface defining a passage for the flow of extruded material under pressure and an outer surface, means defining an annular chamber which surrounds the outer surface of the porous sleeve and passage means communicating with the chamber for supplying gaseous fluid under pressure.

4. A plate extruder as claimed in claim 3, wherein a case which is secured to the body of the extruder defines the annular chamber, and further including means for continuously feeding a wire axially through said sleeve.

* * * * *